United States Patent [19]

Ishida

[11] Patent Number: 5,506,796

[45] Date of Patent: Apr. 9, 1996

[54] DIGITAL SIGNAL PROCESSING CIRCUIT SELECTIVELY OPERABLE IN EITHER A NORMAL OR A PSEUDORANDOM NOISE GENERATIVE MODE

[75] Inventor: Ryuji Ishida, Tokyo, Japan

[73] Assignee: NEC Corporation, Tokyo, Japan

[21] Appl. No.: 348,821

[22] Filed: Nov. 28, 1994

[30] Foreign Application Priority Data

Nov. 26, 1993 [JP] Japan ................................. 5-296515

[51] Int. Cl.$^6$ ....................................................... H04L 9/06
[52] U.S. Cl. ........................ 364/717; 377/72; 377/73; 331/78
[58] Field of Search ............................. 377/70, 72, 75, 377/73; 364/717; 380/50; 331/78

[56] References Cited

U.S. PATENT DOCUMENTS

| | | | |
|---|---|---|---|
| 4,531,022 | 7/1985 | Pioli | 377/72 |
| 4,905,241 | 2/1990 | Schmid et al. | 377/72 |
| 5,105,376 | 4/1992 | Pedron | 364/717 |

FOREIGN PATENT DOCUMENTS

| | | |
|---|---|---|
| 0196152 | 10/1986 | European Pat. Off. |
| 61-82014 | 4/1988 | Japan |
| 63-250210 | 10/1988 | Japan |

*Primary Examiner*—John S. Heyman
*Attorney, Agent, or Firm*—Young & Thompson

[57] ABSTRACT

A circuitry with a pseudorandom noise generative function has a shift register for converting serial data into parallel data, an exclusive OR gate electrically connected to the shift register for fetching outputs from the shift register, the exclusive OR gate supplying exclusive ORed data to the shift register for use in generating a pseudorandom noise and a switch electrically connected to a data line transmitting serial digital data to be processed therein and an output of the exclusive OR gate for fetching the digital data and the exclusive ORed data respectively to select the serial digital data or the exclusive ORed data in response to a selective signal, the switch being electrically connected to the shift register for supplying the serial digital data or the exclusive ORed data to the shift register, thereby selecting a normal processing mode for the digital data or a pseudorandom noise generative mode for the exclusive ORed data.

13 Claims, 4 Drawing Sheets

DIGITAL SIGNAL PROCESSING CIRCUIT SELECTIVELY OPERABLE IN EITHER A NORMAL OR A PSEUDORANDOM NOISE GENERATIVE MODE

BACKGROUND OF THE INVENTION

1. Field of the Invention

This invention relates to a digital signal processing circuit, and more particularly to a digital signal processing circuit having a pseudorandom noise generative function for use of a digital signal processing.

2. Description of the Related Art

It is necessary to use pseudorandom noise for a predetermined process in a signal processing unit processing a time series digital data, in addition to processing a normal input data. In the field of audio units, there are applications such as the Dolby pro-logic which must have the pseudorandom noise generative function for setting up an output level of peripheral equipments such as speakers.

A linear feedback shift register has been well known as the pseudorandom noise generative unit and is disclosed in the Japanese laid-open publications Nos. 63-82014 and 63-250210. The linear feedback shift register comprises a circuit in which flip-flops are serially connected to compose a shift register and some outputs of the flip-flops are fed back to an input of the shift register through an exclusive OR gate. An n-bits linear feedback shift register generates an M series pulse, the pseudorandom noise, having a cycle of N ($\leq 2^n-1$).

FIG. 1 shows an example of a 4 bit linear feedback shift register. When an initial state of the linear feedback shift register is $(Q_1Q_2Q_3Q_4)=(1000)$, the outputs of each flip-flop are changed as shown in FIG. 1 and the outputs of them also return to the initial state when the 15th clock arrives in each flip-flop. In this case, the output patterns of each flip-flop are pseudorandom patterns having a maximum length (N=15) which may be generated by the 4-bits linear feedback shift register.

There are two types of the conventional digital signal processing circuit with the pseudorandom noise generative function. One is provided with the linear feedback shift register for generation of the pseudorandom noise as the another circuit and the other one uses its arithmetic and logic circuit (ALU) and the shift register to generate the pseudorandom noise in part of an arithmetic processing without using the linear feedback shift register.

The conventional digital signal processing circuits with the pseudorandom noise generative function are, however, engaged with a disadvantage as follows. In the former, it is necessary to have hardware resources such as the linear feedback shift register and the like. Thus, a scale of the circuit is made larger because of an addition of the hardware resources. On the contrary, the hardware resources added to the circuit are not used in the normal digital signal processing mode which is not necessary to use the pseudorandom noise at all. In addition, a data input port of the digital signal processing circuit must be changed to connect with an output of the linear feedback shift register for fetching the pseudorandom noise data to be processed from the linear feedback shift register, for which it is required to change a processing sequence of the digital signal processing circuit.

In the latter, the number of the steps for processing the data is increased since the pseudorandom noise generative process is added to the normal input data process. Thus, an ability of the processing unit is remarkably decreased when the time series digital data such as the audio data is processed by a real-time processing.

SUMMARY AND OBJECTS OF THE INVENTION

Accordingly, it is an object of the invention to provide a novel digital signal processing circuit with a pseudorandom noise generative function.

It is a further object of the invention to provide a novel digital signal processing circuit with a pseudorandom noise generative function which has a simple component and can be easily controlled.

It is a still further object of the invention to provide a novel digital signal processing circuit with a pseudorandom noise generative function which can prevent a scale of a circuit from becoming larger.

It is a still further object of the invention to provide a novel digital signal processing circuit with a pseudorandom noise generative function which can prevent a program from being complicated and an ability of processing of a processing unit from decreasing.

The above and other objects, features and advantages of the present invention will be apparent from the following descriptions.

In accordance with the invention, there is provided a circuitry with a pseudorandom noise generative function comprising a shift register for converting serial data into parallel data, an exclusive OR gate being electrically connected to the shift register for fetching outputs from the shift register, the exclusive OR gate supplying exclusive ORed data to the shift register for use of generating a pseudorandom noise and a switch being electrically connected to a data line transmitting serial digital data to be processed therein and an output of the exclusive OR gate for fetching the digital data and the exclusive ORed data respectively to select the serial digital data or the exclusive ORed data in response to a selective signal, the switch being electrically connected to the shift register for supplying the serial digital data or the exclusive ORed data to the shift register, thereby selecting a normal processing mode for the digital data or a pseudorandom noise generative mode for the exclusive ORed data.

It is preferred that the exclusive OR gate has two inputs being electrically connected to the shift register for receipt of a most significant bit and a second bit from the most significant bit of the shift register respectively.

It is also preferred that the shift register shifts the serial data synchronizing with a bit clock showing a respective position of bits of a word in the serial data and the shift register converts the serial data into the parallel data synchronizing with word clocks showing ends of every words in the serial data.

It is also preferred that the switch comprises a first switch being electrically connected to an input of the shift register, the output of the exclusive OR gate and the data line of the serial digital data for selecting the serial digital data or the exclusive ORed data in response to the selective signal to supply it as the serial data to the shift register and a second switch being electrically connected to a data line of the bit clock, a data line of the word clock and clock inputs of the shift register for selecting the bit clock or the word clock to supply it to the clock inputs in response to the selective signal.

It is also preferred that the first switch selects the digital data when receipt of the selective signal ordering the normal processing mode, while the first switch selects the exclusive ORed data when receipt of the selective signal ordering the pseudorandom noise generative mode.

It is also preferred that the second switch selects the bit clock when receipt of the selective signal ordering the normal processing mode, while the second switch selects the word clock when receipt of the selective signal ordering the pseudorandom noise generative mode.

There is also provided a digital signal processing circuit comprising a first shift register for converting serial data into parallel data, an exclusive OR gate being electrically connected to the first shift register for fetching outputs from the shift register, the exclusive OR gate supplying exclusive ORed data to the first shift register for use of generating a pseudorandom noise, a switch being electrically connected to a data line transmitting serial digital data to be processed therein and an output of the exclusive OR gate for fetching the digital data and the exclusive ORed data respectively to select the serial digital data or the exclusive ORed data in response to a selective signal, the switch being electrically connected to the first shift register for supplying the serial digital data or the exclusive ORed data to the first shift register, thereby selecting a normal processing mode for the digital data or a pseudorandom noise generative mode for the exclusive ORed data, an arithmetic circuit being electrically connected to the shift register for fetching the parallel data from the shift register and performing arithmetic on the parallel data and a second shift register being electrically connected to the arithmetic circuit for fetching the parallel data from the arithmetic circuit and for converting the parallel data into serial data as output data.

It is preferred that the exclusive OR gate has two inputs being electrically connected to the shift register for receipt of a most significant bit and a second bit from the most significant bit of the shift register respectively.

It is also preferred that the the shift register shifts the serial data synchronizing with a bit clock showing a respective position of bits of a word in the serial data and the shift register converts the serial data into the parallel data synchronizing with word clocks showing ends of every words in the serial data.

It is also preferred that the switch comprises a first switch being electrically connected to an input of the shift register, the output of the exclusive OR gate and the data line of the serial digital data for selecting the serial digital data or the exclusive ORed data in response to the selective signal and a second switch being electrically connected to a data line of the bit clock, a data line of the word clock for selecting and clock inputs of the shift register for selecting the bit clock or the word clock to supply it to the clock inputs in response to the selective signal.

It is also preferred that the first switch selects the digital data when receipt of the selective signal ordering the normal processing mode, while the first switch selects the exclusive ORed data when receipt of the selective signal ordering the pseudorandom noise generative mode.

It is also preferred that the second switch selects the bit clock when receipt of the selective signal ordering the normal processing mode, while the second switch selects the word clock when receipt of the selective signal ordering the pseudorandom noise generative mode.

BRIEF DESCRIPTION OF THE DRAWINGS

Preferred embodiments of the present invention will hereinafter fully be described in detail with reference to the accompanying drawings.

PREFERRED EMBODIMENTS OF THE INVENTION

Figure 1:
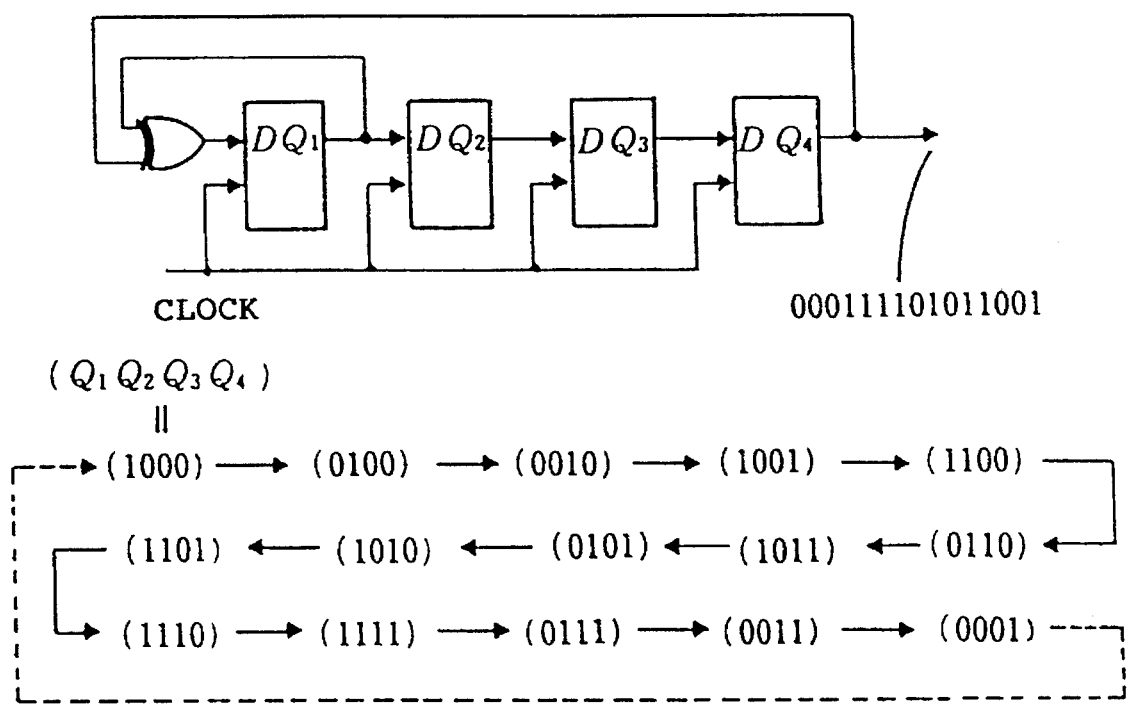
FIG. 1 is a block diagram showing a linear feedback shift register.
Figure 2:
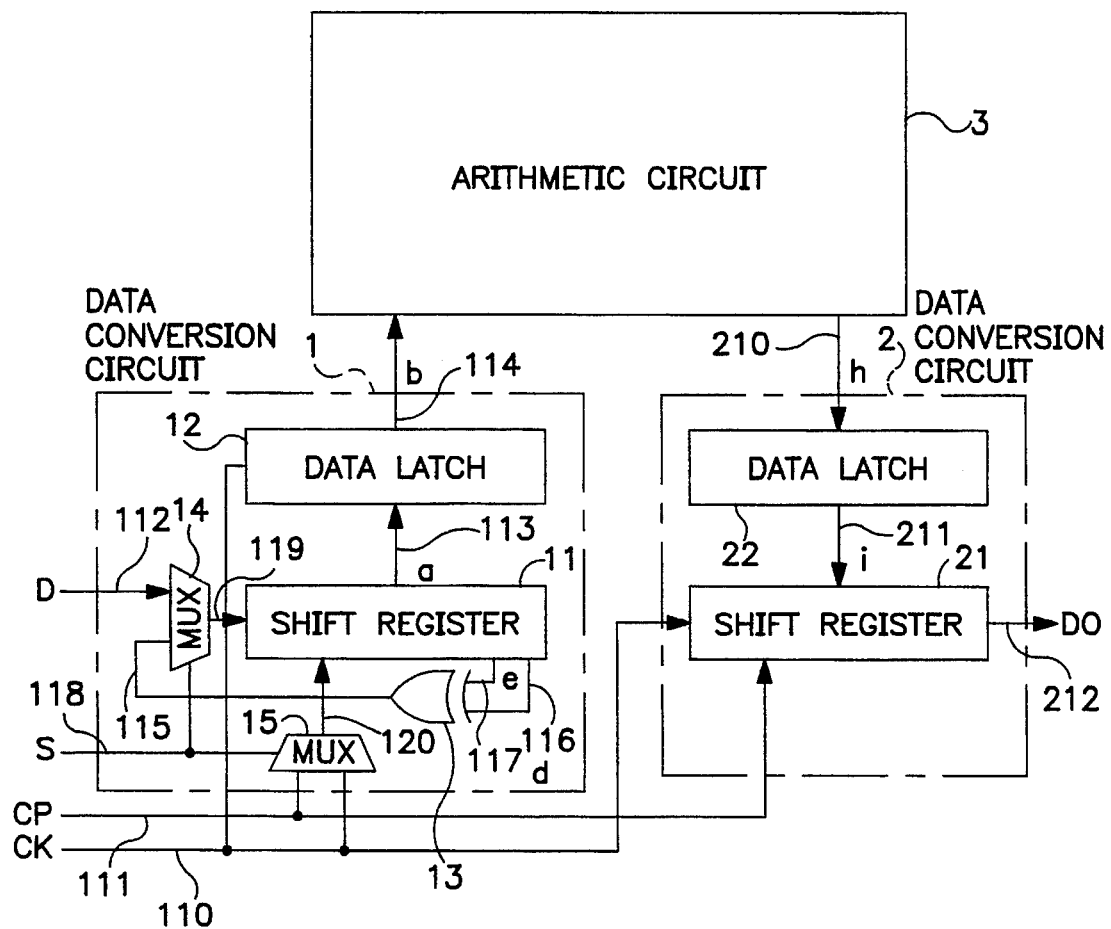
FIG. 2 is a block diagram showing a digital signal processing circuit of an embodiment according to the invention.

An embodiment according the invention will be described with reference to the drawings. FIG. 2 shows a digital signal processing circuit with a pseudorandom noise generative function.

The digital signal processing circuit as shown in FIG. 2 deals with, for instance, digital data of one word comprising 16 bits which is typically used as audio data. The digital signal processing circuit comprises a first data conversion circuit 1 switching to a normal input data processing mode or a pseudorandom noise generation mode for setting up an output level of peripheral equipments such as speakers depending on a selective signal and converting the input or the pseudorandom noise data from serial to parallel data, an arithmetic circuit 3 being electrically connected to the first data conversion circuit 1 for processing the input data or the pseudorandom noise data and a second data conversion circuit 2 being electrically connected to the arithmetic circuit 3 and converting the data processed by the arithmetic circuit 3 from parallel to serial to supply it to the next stage.

The first digital conversion circuit 1 comprises a 16-bits shift register 11 converting a data to be supplied from serial to parallel, a data latch 12 for fetching an output parallel data from the shift register 11, an exclusive OR gate 13 operating on two input signals from predetermined bits of the shift register 11 to produce its output data, a first multiplexer 14 selecting an input data such as the audio data or an output data from the exclusive OR gate 13 to supply its output data to the shift register 11 and a second multiplexer 15 selecting a bit clock "CP" or a word clock "CK" to supply its output to the shift register 11. The word clock "CK" shows an end of one-word (16 bits) and a sampling frequency and the bit clock "CP" shows a bit position of each word.

In more detail, the first multiplexer 14 is electrically connected to a data line 112 to fetch an input data "D" from a source and a data line 115 to fetch a data "C" from the exclusive OR gate 13. The first multiplexer 14 is also electrically connected to a data line 118 to fetch a selective signal "S" from the data line 118 for selection of the input data "D" or the pseudorandom noise data "C". The first multiplexer 14 is further electrically connected to a data line 119 to supply the selected data to the shift register 11.

The second multiplexer 15 is electrically connected to a data line 110 to fetch the work clock "CK" from the data line 110 and a data line 111 to fetch the bit clock "CP" from the data line 110. The second multiplexer 15 is also electrically connected to a data line 118 to fetch the selective signal "S" for selection of the word clock "CK" or the bit clock "CP". The second multiplexer 15 is further electrically connected to a data line 112 to supply the selected data to the shift register 11 depending on the selective signal "S".

The shift register 11 is electrically connected to the data line 119 to fetch the selected data from the first multiplexer 14 and to the data line 120 to fetch the selected clock from the second multiplexer 15. In the shift register 11, the data are continuously shifted to each bit of the shift register 11 synchronizing with the bit clock "CP" or the word clock "CK". The shift register 11 is also electrically connected to a data line 113 to supply the shifted data to the data latch 12.

The exclusive OR gate 13 has two inputs connected to data lines 116 and 117 to fetch the data "d" and "e" from the 16th bit and 15th bit of the shift register. The exclusive OR gate 13 is also connected to a data line 115 to supply its output data "c" to the first multiplexer 14.

The data latch 12 is electrically connected to the data line 110 to fetch the word clock "CK" from the data line 110. The data latch 12 is also electrically connected to the data line 113 to fetch the data "a" converted from the serial to the parallel from the shift register 11 synchronizing with the word clock "CK". The data latch 12 is further electrically connected to a data line 114 to supply the data "b" to the arithmetic circuit 3.

The second data conversion circuit 2 comprises a data latch 22 for fetching an output data from the arithmetic circuit 3 and a shift register 21 for converting an output data of the data latch 22 from parallel to serial to supply its output signal to the next stage.

In more detail, the data latch 22 is electrically connected to a data line 210 to fetch the data "h" from the arithmetic circuit 3 and a data line 211 to supply its output data "i" to the shift register 21. The shift register is electrically connected to the data line 110 to fetch the word clock from the data line 110 and to the data line 111 to fetch the bit clock "CP" from the data line 111. The shift register 21 is also electrically connected to the data line 211 to fetch the data "i" from the data latch 22 synchronizing with the word clock "CK". The data "i" are shifted each bit of the shift register 21 synchronizing with the bit clock "CP". The shift register is further electrically connected to a data line 212 to supply its output data "DO" converted into a time series data to the next stage.

The above digital signal processing circuit typically uses a serial data transmission system in transmitting the audio data and a three-line-type interface consisting of the three transmission lines of the word clock "CK", the bit clock "CP" and the data "D". For processing the data such as the audio data, the audio data processing is typically carried out, in which the digital signal processing circuit fetches the data which is currently transmitting on the transmission line, the data is made a predetermined processing by the digital signal processing circuit in accordance with, for instance, a pipeline processing and is supplied to the next stage by synchronization with the word clock "CK" and the bit clock "CP".

Figure 3:
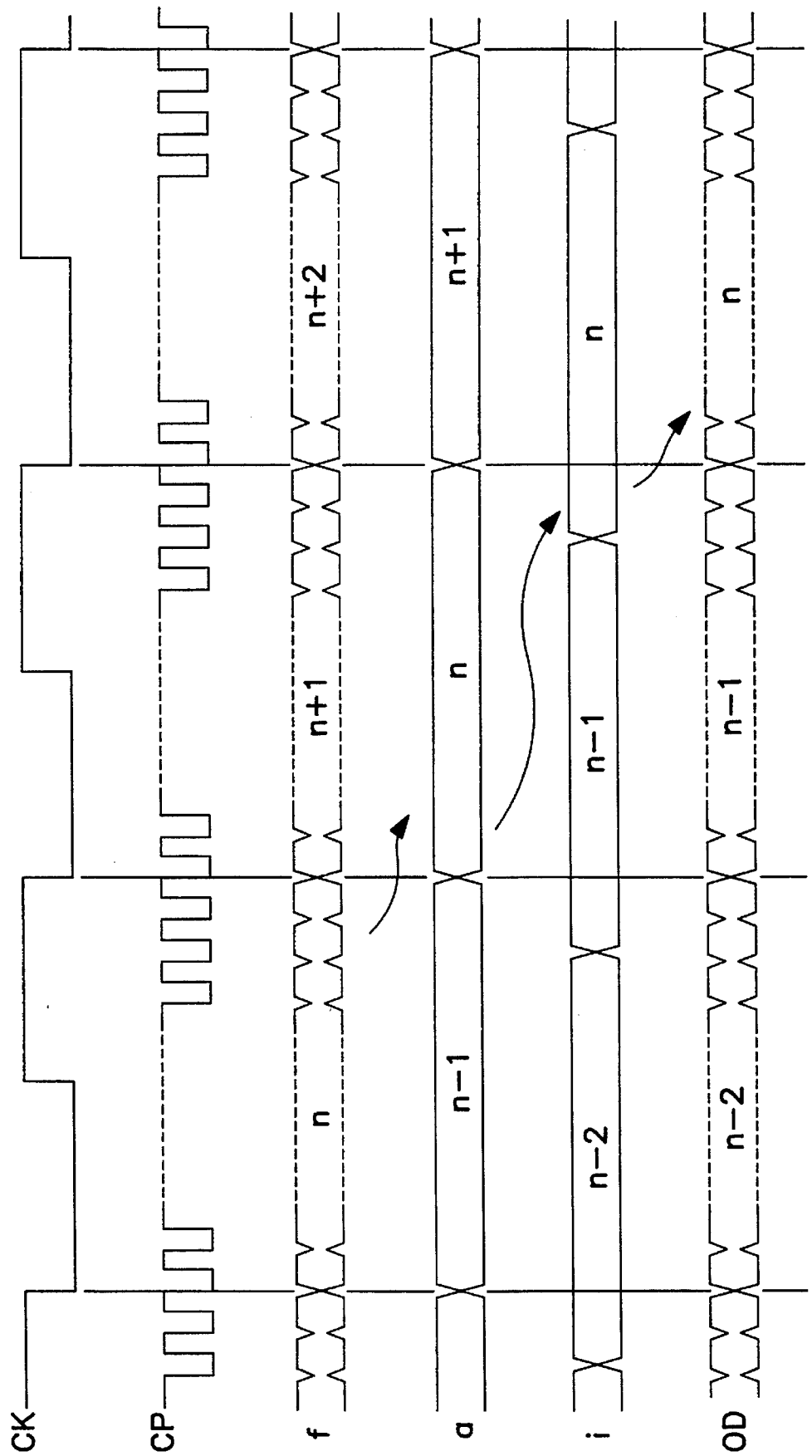
FIG. 3 is a time chart showing a process of a normal input data in a digital signal processing circuit of an embodiment according to the invention.

FIG. 3 shows a time chart of processing a normal input data such as the audio data in the digital signal processing circuit. In operation, when the selective signal "S" is a low level (0), the first data conversion circuit becomes the serial-parallel conversion mode for processing a normal input data "D". According to the low level of the selective signal "S", the first multiplexer 14 selects the data line 112 and the second multiplexer 15 selects the data line 111. Therefore, the data "D" is supplied to the first bit of the shift register 11 through the first multiplexer 14 synchronizing with the bit clock "CP" supplied from the data line 111. Next data "D" is also continuously supplied to the shift register 11 and shifted into the next bit of the shift register 11. The data "a" in the shift register 11 are supplied to the data latch 12 when the word clock "CK" showing that the shift register 11 is filled with the data "D" is supplied to the data latch 12 from the data line 110. In the operation, the data "D" are converted from the serial to the parallel.

The data "b" supplied from the shift register 11 is also supplied to the arithmetic circuit 3. In the arithmetic circuit 3, the data "b" is processed during the sampling cycle, namely, until the next data "a" is supplied from the shift register 11 to the data latch 12. When the processing of the data in the arithmetic circuit 3 finishes, the data "h" processed by the arithmetic circuit 3 is supplied to the data latch 22. Subsequently, the output data "i" of the data latch 22 is supplied to the shift register 21 synchronizing with the word clock "CK". Each of data is shifted into the next bit of the shift register 21 to be supplied to the next stage as the output data "DO". In such operation of the shift register 21, the data "i" is converted from the parallel to the serial. This process in the digital signal processing circuit continues.

As explained above, the time series digital data are processed for obtaining predetermined data by the arithmetic circuit 3 in accordance with the pipeline processing, after which the processed data are supplied to the data line 212 to achieve the real-time processing.

Figure 4:
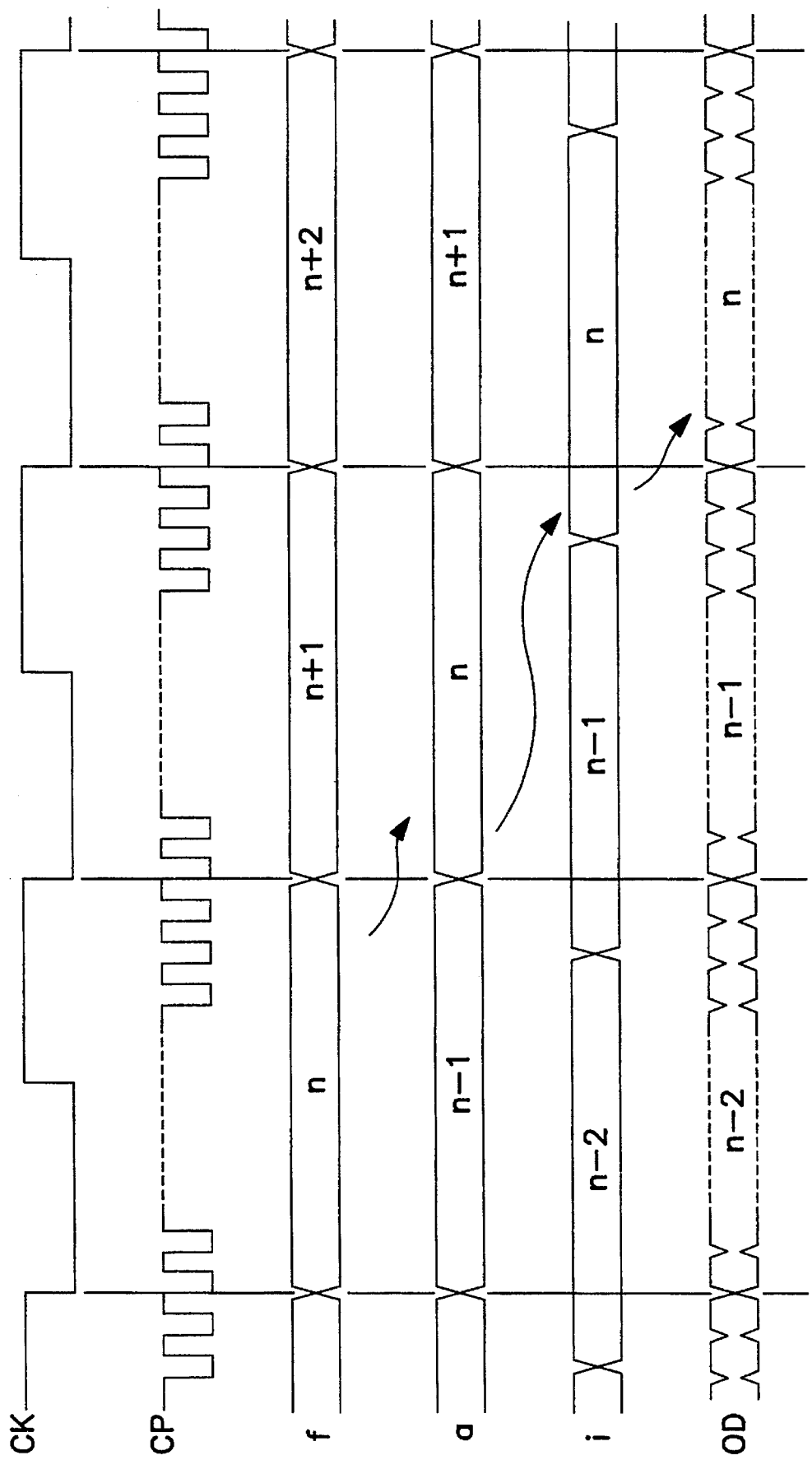
FIG. 4 is a time chart showing a process of a pseudorandom noise in a digital signal processing circuit of an embodiment according to the invention.

FIG. 4 shows a time chart of processing a pseudorandom noise in the digital signal processing circuit. In operation, when the selective signal "S" is a high level (1), the first data conversion circuit becomes the pseudorandom noise generation mode for setting up, for example, an output level of peripheral equipments such as speakers. This pseudorandom noise generation mode is selected when it is required to set up the output level of the peripheral equipment. The first multiplexer 14 selects the data line 115 and the second multiplexer 15 selects the data line 110. Therefore, an input data of the shift register 11 is data which are taken an exclusive OR to the data "d" of the most significant bit (the 16th bit) and the data "e" of the bit next to the most significant bit (the 15th bit) therein. Also, since the shift clock of the shift register 11 is changed from the bit clock "CP" to the word clock "CK", the shift operation of the shift register 11 is carried out for every sampling cycle (1 word). Namely, the data "a" in the shift register 11 is supplied to the data latch 12 simultaneously with shifting the data in the shift register 11 every the sampling cycle.

Therefore, the data supplied to the data latch 12 have already come into a time series pseudorandom noise data. The data "b" in the data latch 12 is supplied to the arithmetic circuit 3. In the arithmetic circuit 3, the data "b", the pseudorandom noise, is processed as the same the processing of the normal input data processing mode as explained above. Subsequently, the data "h" processed by the arithmetic circuit 3 is supplied to the data latch 22. When the word clock "CK" arrives in the shift register 21, the data "i" is supplied from the data latch 22 to the shift register 21. The data "i" supplied to the shift register 21 are shifted into the bit therein synchronizing with the bit clock "CP" and supplied to the next stage as the output data "DO". In such operation, the pseudorandom data processed by the arithmetic circuit 3 is converted from the parallel to the serial in the second data conversion circuit 2. The output data "DO" is utilized to set up the peripheral equipments such as the speakers.

As explained above, it is easily possible to process the pseudorandom noise for setting up the level of the peripheral equipment such as the speakers, when it is required to set them up.

In the above embodiment, the digital signal processing circuit can easily be switched between the normal input data processing mode and the pseudorandom noise processing mode in the same component. Accordingly, the digital signal processing circuit can prevent a scale of a circuit from making larger. Also, it is not necessary to use a complicated program for control of the digital signal processing circuit. Thus, the ability of processing of the circuit can be brought out according to the above component. Further, it may be changed to connect inputs of the exclusive OR gate 13 with the 16th and the 15th bits of the shift register 11 if the pseudorandom noise were obtained.

Whereas modifications of the present invention will no doubt be apparent to a person of ordinary skilled in the art to which the invention pertains, it is to be understood that the embodiments shown and described by way of illustration are by no means intended to be considered in a limiting sense. Accordingly, it is to be intended by the claims to cover all modifications of the invention which fall within the spirit and scope of the invention.

What is claimed is:

1. A circuitry with a pseudorandom noise generative function comprising:

a shift register for converting serial data into parallel data, said shift register shifting said serial data in synchronism with a bit clock indicating a respective position of bits of a word in said serial data, and converting said serial data into said parallel data in synchronism with word clocks indicating ends of every word in said serial data;

an exclusive OR gate electrically connected to said shift register for fetching outputs from said shift register, said exclusive OR gate supplying exclusive ORed data to said shift register for use in generating pseudorandom noise; and a switch electrically connected to a data line transmitting serial digital data to be processed therein and an output of said exclusive OR gate for fetching said digital data and said exclusive ORed data respectively to select one of said serial digital data and said exclusive ORed data in response to a selective signal, said switch being electrically connected to said shift register for supplying said one of said serial digital data and said exclusive ORed data to said shift register, thereby selecting one of a normal processing mode for said digital and a pseudorandom noise generative mode for said exclusive ORed data, said switch comprising a first switch electrically connected to an input said shift register, said output of said exclusive OR gate and said data line of said serial digital data for selecting said one of said serial digital data and said exclusive ORed data in response to said selective signal to supply said serial data to said shift register; and a second switch electrically connected to a data line of said bit clock, a data line of said word clock and clock inputs of said shift register for selecting one of said bit clock and said word clock to supply to said clock inputs in response to said selective signal.

2. A circuitry with a pseudorandom noise generative function according to claim 1, wherein said exclusive OR gate comprises two inputs electrically connected to said shift register for receipt of a most significant bit and a second bit from said most significant bit of said shift register respectively.

3. A circuitry with a pseudorandom noise generative function according to claim 1, wherein said first switch selects said digital data upon receipt of said selective signal ordering said normal processing mode, while said first switch selects said exclusive ORed data upon receipt of said selective signal ordering said pseudorandom noise generative mode.

4. A circuitry with a pseudorandom noise generative function according to claim 1, wherein said second switch selects said bit clock upon receipt of said selective signal ordering said normal processing mode, while said second switch selects said word clock upon receipt of said selective signal ordering said pseudorandom noise generative mode.

5. A circuitry with a pseudorandom noise generative function according to claim 1, wherein said first and second switches comprise multiplexers.

6. A digital signal processing circuit comprising:

a first shift register for converting serial data into parallel data;

an exclusive OR gate being electrically connected to said first shift register for fetching outputs from said shift register, said exclusive OR gate supplying exclusive ORed data to said first shift register for use of generating a pseudorandom noise;

a switch being electrically connected to a data line transmitting serial digital data to be processed therein and an output of said exclusive OR gate for fetching said digital data and said exclusive ORed data respectively to select said serial digital data or said exclusive ORed data in response to a selective signal, said switch being electrically connected to said first shift register for supplying said serial digital data or said exclusive ORed data to said first shift register, thereby selecting a normal processing mode for said digital data or a pseudorandom noise generative mode for said exclusive ORed data;

an arithmetic circuit being electrically connected to said shift register for fetching said parallel data from said shift register and performing arithmetic on said parallel data; and a second shift register being electrically connected to said arithmetic circuit for fetching said parallel data from said arithmetic circuit and for converting said parallel data into serial data as output data.

7. A digital signal processing circuit according to claim 6, wherein said exclusive OR gate has two inputs being electrically connected to said shift register for receipt of a most significant bit and a second bit from said most significant bit of said shift register respectively.

8. A digital signal processing circuit according to claim 6, wherein said shift register shifts said serial data synchronizing with a bit clock showing a respective position of bits of a word in said serial data and said shift register converts said serial data into said parallel data synchronizing with word clocks showing ends of every words in said serial data.

9. A digital signal processing circuit according to claim 6, wherein said switch comprises:

a first switch being electrically connected to an input of said shift register, said output of said exclusive OR gate and said data line of said serial digital data for selecting said serial digital data or said exclusive ORed data in response to said selective signal; and a second switch being electrically connected to a data line of said bit clock, a data line of said word clock for selecting and clock inputs of said shift register for selecting said bit clock or said word clock to supply it to said clock inputs in response to said selective signal.

10. A digital signal processing circuit according to claim 9, wherein said first switch selects said digital data when receipt of said selective signal ordering said normal processing mode, while said first switch selects said exclusive ORed data when receipt of said selective signal ordering said pseudorandom noise generative mode.

11. A digital signal processing circuit according to claim 9, wherein said second switch selects said bit clock when receipt of said selective signal ordering said normal processing mode, while said second switch selects said word clock when receipt of said selective signal ordering said pseudorandom noise generative mode.

12. A digital signal processing circuit according to claim 9, wherein said first and second switches comprises multiplexers.

13. A digital signal processing circuit comprising:

a first data line for transmitting serial digital data to be processed thereto;

a second data line for transmitting a bit clock showing a respective position of bits of a word in said serial data thereto;

a third data line for transmitting word clocks showing ends of every words in said serial data;

a forth data line for transmitting a selective signal for selecting a normal processing mode or a pseudorandom noise generative mode;

a first shift register for converting serial data into parallel data, said first shift register shifting said serial data into the next bit synchronizing with said bit clock and converting said serial data into said parallel data synchronizing with a word clock;

an exclusive OR gate being electrically connected to predetermined bits of said shift register for fetching outputs from said predetermined bits, said exclusive OR gate supplying exclusive ORed data to said shift register for generating a pseudorandom noise;

a first multiplexer being electrically connected to said first data line and an output of said exclusive OR gate for fetching said serial digital data and said exclusive ORed data respectively, said first multiplexer being electrically connected to an input of said shift register and said fourth data line for selecting said serial digital data or said exclusive ORed data to supply it to said shift register in response to a selective signal;

a second multiplexer being electrically connected to said second and third data lines for fetching said bit clock and said word clock respectively, said second multiplexer being electrically connected to clock inputs of said shift register and said fourth data line for selecting said bit clock or said word clock to supply it to clock inputs of said shift register in response to a selective signal;

an arithmetic circuit being electrically connected to said shift register for fetching said parallel data from said shift register and performing arithmetic on said parallel data; and a second shift register being electrically connected to said arithmetic circuit for fetching said parallel data from said arithmetic circuit, said second n-bits shift register converting said parallel data into serial data synchronizing with said word clock and shifting said serial data into next bit respectively synchronizing with said bit clock;

wherein said first switch selects said digital data when receipt of said selective signal ordering said normal processing mode, while said first switch selects said exclusive ORed data when receipt of said selective signal ordering said pseudorandom noise generative mode; and wherein said second switch selects said bit clock when receipt of said selective signal ordering said normal processing mode, while said second switch selects said word clock when receipt of said selective signal ordering said pseudorandom noise generative mode.

* * * * *